UNITED STATES PATENT OFFICE 2,563,401

4-(2'-THIENYL)-2-MERCAPTOTHIAZOLES

William S. Emerson and Tracy M. Patrick, Jr., Dayton, Ohio, assignors to Monsanto Chemical Company, St. Louis, Mo., a corporation of Delaware No Drawing. Application August 27, 1947,
Serial No. 770,958

8 Claims. (Cl. 260—302)

The present invention relates to 4-(2'-thienyl)-2-mercaptothiazoles and derivatives thereof and to their preparation. By 4-(2'-thienyl)-2-mercaptothiazole is meant a compound of the structure

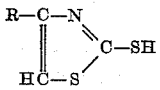

where R is a 2-thienyl group as for example a 2-thienyl, 5-chloro-2-thienyl, 5-bromo-2-thienyl, or 5-methyl-2-thienyl group.

The hydrogen of the mercapto group is a reactive hydrogen and enters into a variety of reactions for the preparation of useful derivatives. The compounds of this invention include derivatives in which the hydrogen is replaced by metal, ammonium or substituted ammonium salt forming groups, ester forming groups, ether forming groups or is removed by oxidation to form the corresponding disulfides.

The general formula of the compounds of this invention is

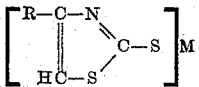

where R is a 2-thienyl group and M is hydrogen, a salt forming group, an ester forming group, an ether forming group or the group in parentheses. Typical examples of salt forming groups are $NH_4$—, $C_6H_{11}NH_3$—, $(C_2H_5)_2NH_2$—, $(CH_3)_2NH_2$—, $HOC_2H_4NH_3$—, $CH_3NH_3$—, $C_2H_5NH_3$—

$C_6H_{11}(CH_3)NH_2$—, $C_4H_9NH_3$—, $(C_4H_9)_2NH_2$—

$C_{10}H_{21}NH_3$—, $(C_6H_{11})_2NH_2$—

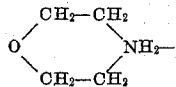

$(CH_2)_5NH_2$—, Na, K, Zn, Pb, Sn, Mg, Hg, and Ca. By ester forming groups are meant acyl and aroyl groups examples of which are

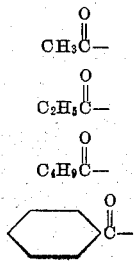

and

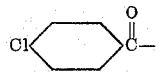

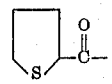

By ether forming groups are meant mono-substituted methyl groups resulting in the formation of compounds in which the sulfur atom is attached to a methylene group. Typical examples of ether forming groups are

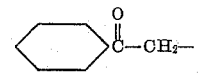

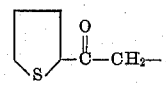

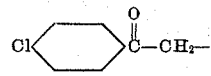

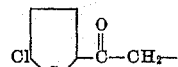

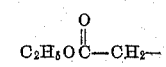

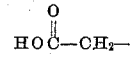

and the like.

Disulfides of 4-(2'-thienyl)-2-mercaptothiazoles are readily obtained by oxidation of the corresponding mercaptans with hydrogen peroxide, sodium hypochlorite, chlorine or other oxidizing agent.

The synthesis of 2-mercaptothiazoles substituted in the 4-position by an aromatic group has been effected by reacting phenacyl bromide with ammonium dithiocarbamate. For instance, Miolati, Gazz. chim. ital. 23 (1), 575 (1893) got 4-phenyl-2-mercaptothiazole from phenacyl bromide and ammonium dithiocarbamate by heating in alcoholic solution. Levi, Gazz. chim. ital., 61, 719 (1931) treated phenacyl bromide with ammonium dithiocarbamate in ether to obtain phenacyl dithiourethane which cyclized on heating above its melting point to 4-phenyl-2-mercaptothiazole. Similarly, Ubaldini and Fiorenza, Gazz. chim. ital., 73, 169–175 (1943) obtained phenacyl dithiourethane and 4-phenyl-2-thiazyl phenacyl thioether from equimolecular amounts of phenacyl bromide and ammonium dithiocarbamate.

From equimolar portions after 16 hours they got 55% of 4-phenyl-2-mercaptothiazole and 45% of the thioether. When the molar ratio of phenacyl bromide and ammonium dithiocarbamate was 2:1, they got 100% of the thioether after 16 hours. The mercaptothiazole reacted with phenacyl bromide in ether to yield the hydrobromide of the thioether. Also, the dithiourethane and phenacyl bromide yielded the thioether.

While the 4-thienyl-2-mercaptothiazoles may be prepared in analogous manner, namely by reaction of ω-bromoacetothienone and ammonium dithiocarbamate, very much better results are obtained by reacting ω-chloroacetothienone and a dithiocarbamate. Bromides are frequently preferred to chlorides in organic synthesis because of their greater reactivity but the increased reactivity has in this instance been found to be a disadvantage.

The following are specific embodiments of the invention which are to be taken as illustrative but not limitative thereof.

EXAMPLE I

A mixture of 120.3 g. (0.75 mole) of ω-chloroacetothienone, 82.5 g. (0.75 mole) of ammonium dithiocarbamate, and 600 ml. of anhydrous ether was placed in a 1500 ml. Erlenmeyer flask cooled by an ice bath. The flask was stoppered and shaken occasionally. After one-half hour the ice bath was removed and the flask was allowed to stand at room temperature for fifteen days with occasional shaking. The mixture now consisted of yellow crystals in ether suspension. The crystals were removed by filtration and treated with 1 liter of cold 5% sodium hydroxide solution. Most of the solid dissolved. The resulting suspension was filtered and the filtrate made acid with 10% hydrochloric acid, causing a yellow-tan precipitate of crude 4-(2'-thienyl)-2-mercaptothiazole to form. The product was removed by filtration, washed with water, and dried. It weighed 74.1 g. and melted at 176–177° C. (cor.).

The ether filtrate from above was washed three times with water, and then extracted with 5% sodium hydroxide. Acidification of the alkali extract with 10% hydrochloric acid yielded a crude solid which was recrystallized from dilute ethanol (Norite) several times. A second crop (4.8 g.) of crude 4-(2'-thienyl)-2-mercaptothiazole, M. P. 164–168° C. (cor.) was obtained.

An analytical sample of 4-(2'-thienyl)-2-mercaptothiazole, obtained by repeated crystallization from ethanol, melted at 177° C. (cor.). Anal.: Calculated for $C_7H_5NS_3$: N, 7.03%; S, 48.29%. Found: N, 7.22%; S, 48.44%.

EXAMPLE II

The alkali insoluble material from Example I obtained from the original separation of the yellow crystals from the ether suspension (8.0 g.) melted at 86–88° C. (cor.). This was identified as the thienacyl thioether of 4-(2'-thienyl)-2-mercaptothiazole.

An analytical sample of the thienacyl thioether of 4-(2'-thienyl)-2-mercaptothiazole, obtained by recrystallization from ethanol, melted at 89–90° C. (cor.). Anal.: Calculated for $C_{13}H_9ONS_4$: N, 4.33%; S, 39.66%. Found: N, 4.58%; S, 39.73%.

EXAMPLE III

A mixture of 161.1 g. of ω-chloroacetothienone, 16.5 g. of ammonium dithiocarbamate and 150 ml. of absolute ethanol was shaken during cooling in an ice bath for thirty minutes. The flask was stoppered and allowed to stand at room temperature for four days with occasional shaking. The slurry of crystals was then diluted with 200 ml. of water and filtered. The residue was washed thoroughly with water, and then treated with 125 ml. of 5% aqueous sodium hydroxide in the cold. The solid was nearly all soluble. The resulting mixture was filtered and the filtrate was carefully acidified with dilute hydrochloric acid. Crude 4-(2'-thienyl)-2-mercaptothiazole precipitated. It was removed by filtration, washed, and dried. It weighed 17.2 g. (86% yield), and melted at 173–176° C. (cor.).

EXAMPLE IV

To an ice-cold solution of 16.5 g. of ammonium dithiocarbamate in 200 ml. of water there was added gradually with shaking 16.1 g. of ω-chloroacetothienone. The flask was stoppered and the mixture was allowed to stand at room temperature with occasional shaking for four days. The yellow solid product was removed by filtration, washed thoroughly with water, and dried. It was then added to 200 ml. of dry benzene and the mixture was refluxed two hours under a Stark and Dean trap. The benzene was then evaporated. The residue was treated simultaneously with 150 ml. of 5% aqueous sodium hydroxide and 100 ml. of benzene. The resulting immiscible solutions were separated, and the benzene solution was extracted once with 15 ml. of aqueous sodium hydroxide. The alkaline solutions were combined, cooled, and acidified with dilute hydrochloric acid. The crude 4-(2'-thienyl)-2-mercaptothiazole thus precipitated weighed 12.4 g. (62% yield) and melted at 171–176° C. (cor.).

EXAMPLE V

A mixture of 39.0 g. of 5,ω-dichloro-2-acetothienone and 33.0 g. of ammonium dithiocarbamate in 250 ml. of anhydrous ether was thoroughly shaken and then allowed to stand at room temperature for four days with occasional shaking. The resulting suspension of yellow crystals was filtered, and the residue was washed with water. The ether filtrate was evaporated to dryness and the residual solid was combined with the solid which had been removed by filtration. The product was treated with 5% sodium hydroxide solution and the alkali-insolubles which contained 4-(5'-chloro-2'-thienyl)-2-thiazyl-5'-chloro-2'-thienacyl thioether were filtered off. The filtrate was cooled and acidified causing crude 4-(5'-chloro-2'-thienyl)-2-mercaptothiazole to precipitate. A pure sample obtained by recrystallization from ethanol melted with decomposition at 205° C. (cor.). Calculated for $C_7H_4NS_3Cl$: S, 41.15%; Cl, 15.16%. Found: S, 40.99%; Cl, 15.12%.

EXAMPLE VI

The crude alkali-insoluble 4-(5'-chloro-2'-thienyl)-2-thiazyl 5'-chloro-2'-thienacyl thioether from Example V was purified by recrystallization from benzene. It melted at 133–134° C. (cor.). Calculated for $C_{13}H_7ONS_4Cl_2$: S, 32.70%; Cl, 18.07%. Found: S, 32.65%; Cl, 17.62%.

EXAMPLE VII

A mixture of 19.5 g. 5,ω-dichloro-2-acetothienone and 16.5 g. of ammonium dithiocarbamate in 150 ml. of absolute ethanol was shaken while cooling in an ice bath for five minutes. The mixture was then allowed to stand at room temperature for seven days with occasional shaking. It was then diluted with 150 ml. of water, cooled, and filtered. The residue was washed thoroughly with water, and then treated with 175 ml. of 10% aqueous potassium hydroxide. Nearly all the solid dissolved. The alkaline mixture was filtered, and the filtrate was cooled and acidified with dilute hydrochloric acid. The precipitated crude 4-(5'-chloro-2'-thienyl)-2-mercaptothiazole, after washing and drying, weighed 20.7 g. (91% yield) and melted with decomposition at 201° C. (cor.).

Products of this invention are valuable accelerators of vulcanization. It is significant that the presence of a thienyl group on the thiazole nucleus enhances the accelerating activity, a thienyl group being more effective for this purpose than a phenyl group. As illustrative of the accelerating properties, stocks were compounded comprising

| Stock | A | B |
|---|---|---|
| | Parts by weight | Parts by weight |
| Pale crepe rubber | 100 | 100 |
| Zinc oxide | 5 | 5 |
| Stearic acid | 1 | 1 |
| Sulfur | 3 | 3 |
| 4-(2'-thienyl)-2-mercaptothiazole | 1 | |
| 4-Phenyl-2-mercaptothiazole | | 1 |

The stocks so compounded were cured by heating in a press in the usual manner for different periods of time at 126° C. The physical properties of the cured rubber products are set forth below:

Table

| Stock | Cure Time, in mins. | Modulus of Elasticity in lbs./in.² at Elongations of— | | Tensile at Break, in lbs./in.² | Ult. Elong., Per Cent |
|---|---|---|---|---|---|
| | | 500% | 700% | | |
| A | 15 | 401 | 1,270 | 2,641 | 825 |
| B | 15 | 301 | 918 | 1,987 | 830 |
| A | 30 | 488 | 2,293 | 3,262 | 760 |
| B | 30 | 445 | 1,784 | 2,370 | 775 |
| A | 45 | 652 | 2,967 | 3,472 | 740 |
| B | 45 | 592 | 2,420 | 2,433 | 705 |

It will be noted that the tensile strength of the A stock containing the thienyl substituted mercaptothiazole is from about 33% to 43% higher than the B stock containing the phenyl substituted mercaptothiazole. The accelerating strength of the thienyl mercaptothiazoles is comparable to that of mercaptobenzothiazole. Direct comparison of the accelerating activity of 1% on the rubber of 2-mercaptobenzothiazole with 1% of 4-(2'-thienyl)-2-mercaptothiazole and 4-(5'-chloro-2'-thienyl)-2-mercaptothiazole showed that the thienyl substituted compounds were substantially equivalent to mercaptobenzothiazole.

While the invention has been illustrated by reference to a number of specific embodiments of the invention, it will be apparent that many variations may be made from the specific procedures described and from the particular compounds, reacting ingredients, compounding ingredients and solvents specifically enumerated.

This invention is limited solely by the claims attached hereto as part of the present specification.

What is claimed is:
1. A compound of the structure

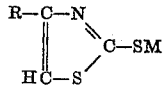

where R is a 2-thienyl group and M is a member of the group consisting of hydrogen, salt forming groups and

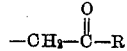

groups.

2. A compound of the structure

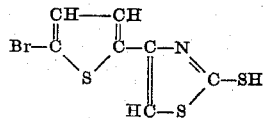

3. A compound of the structure

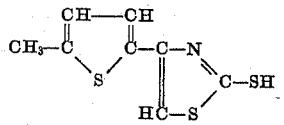

4. A compound of the structure

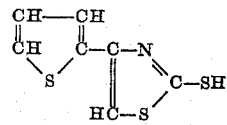

5. A compound of the structure

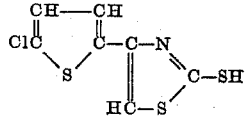

6. The method of making a 2-mercaptothiazole substituted in the 4-position by a thienyl group which comprises reacting a salt of dithiocarbamic acid with a chloride of the structure

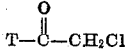

where T represents a 2-thienyl group.

7. The method of making a 2-mercaptothiazole substituted in the 4-position by a thienyl group which comprises reacting ammonium dithiocarbamate with a chloride of the structure

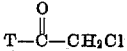

where T represents a 2-thienyl group in a solvent.

8. The method of making a 2-mercaptothiazole substituted in the 4-position by a thienyl group which comprises reacting ammonium dithiocarbamate with ω-chloroacetothienone in a solvent.

WILLIAM S. EMERSON.
TRACY M. PATRICK, JR.

REFERENCES CITED

The following references are of record in the file of this patent:

UNITED STATES PATENTS

| Number | Name | Date |
|---|---|---|
| 2,186,421 | Mathes | Jan. 9, 1940 |
| 2,196,607 | Mathes | Apr. 9, 1940 |
| 2,304,112 | Middleton | Dec. 8, 1942 |